US012627105B2

(12) United States Patent
Huang et al.

(10) Patent No.: US 12,627,105 B2
(45) Date of Patent: May 12, 2026

(54) CONNECTION COMPONENT, CONNECTOR, PATCH CORD AND CONNECTOR INNER SHELL

(71) Applicant: CLOUDMINDS ROBOTICS CO., LTD., Shanghai (CN)

(72) Inventors: Xiao-Qing William Huang, Shanghai (CN); Boyu Cui, Shanghai (CN); Yufeng Zhang, Shanghai (CN); Hai Gao, Shanghai (CN)

(73) Assignee: CHONGQING XINGJIE SHUXING TECHNOLOGY PARTNERSHIP ENTERPRISE (LIMITED PARTNERSHIP), Chongqing (CN)

( * ) Notice: Subject to any disclaimer, the term of this patent is extended or adjusted under 35 U.S.C. 154(b) by 668 days.

(21) Appl. No.: 17/955,835

(22) Filed: Sep. 29, 2022

(65) Prior Publication Data

US 2023/0058029 A1 Feb. 23, 2023

Related U.S. Application Data

(63) Continuation of application No. PCT/CN2021/131574, filed on Nov. 18, 2021.

(51) Int. Cl.

| | |
|---|---|
| ***H01R 24/62*** | (2011.01) |
| ***H01R 13/627*** | (2006.01) |
| ***H01R 24/84*** | (2011.01) |
| *H01R 13/62* | (2006.01) |

(52) U.S. Cl.

CPC ......... *H01R 24/62* (2013.01); *H01R 13/6271* (2013.01); *H01R 13/6272* (2013.01); *H01R 24/84* (2013.01); *H01R 13/62* (2013.01); *H01R 13/627* (2013.01)

(58) Field of Classification Search

CPC ................ H01R 24/62; H01R 13/6271; H01R 13/6272; H01R 24/84; H01R 13/62; H01R 13/627

See application file for complete search history.

(56) References Cited

U.S. PATENT DOCUMENTS

2013/0273760 A1* 10/2013 Narita .................. H01R 12/774 439/153
2018/0069356 A1* 3/2018 Kasar ..................... H01R 24/60
2018/0301842 A1* 10/2018 Somanathapura Ramanna ........... H01R 13/28

FOREIGN PATENT DOCUMENTS

| | | | |
|---|---|---|---|
| CN | 205070027 | U | 3/2016 |
| CN | 210838297 | U | 6/2020 |
| CN | 112201998 | A | 1/2021 |
| JP | 2005183340 | A | 7/2005 |

* cited by examiner

*Primary Examiner* — Justin M Kratt
(74) *Attorney, Agent, or Firm* — Maschoff Brennan

(57) ABSTRACT

The disclosure relates to a connection component, a connector, a patch cord and a connector inner shell. The connection component is configured to achieve electric connection and includes two connectors. The two connectors have same butt-joint structures and are in a butt joint through the butt-joint structures, the connectors have locking mechanisms, in a locking state, the locking mechanisms lock the two connectors, and the two connectors may be separated after the locking mechanisms are switched to an unlocking state.

10 Claims, 6 Drawing Sheets

CONNECTION COMPONENT, CONNECTOR, PATCH CORD AND CONNECTOR INNER SHELL

CROSS REFERENCE TO RELATED APPLICATION

The present application is a continuation of International Patent Application No. PCT/CN2021/131574, filed on Nov. 18, 2021, which claims the benefit of priority to Chinese Application No. 202121981906.8, filed on Aug. 20, 2021, the entire contents of which are incorporated herein by reference.

TECHNICAL FIELD

The disclosure relates to the technical field of connectors, and particularly relates to a connection component, a connector, a patch cord and a connector inner shell.

BACKGROUND

A connector is usually divided into a male end and a female end. At present, a connector on a terminal device (e.g., a computer and a mobile phone) is designed with a female end, while a connector on a patch cord (e.g., a USB patch cord) is designed with a male end, and by inserting the male end into the female end, data transmission or charging is realized. This kind of connector that distinguishes male and female polarities mainly has two defects: first, two connectors with the same polarity cannot be plugged; and second, two patch cords cannot be connected in series directly, and can be connected in series only through another connection cord with female heads at both ends. In addition, the two plugged connectors are prone to slipping off.

SUMMARY

The objects of the disclosure are to provide a connection component, a connector, a patch cord and a connector inner shell so as to solve the problems of distinguishing between male and female polarities and easy slipping off of a connector in the related art.

According to a first aspect of the disclosure, a connection component is provided and is configured to achieve electric connection. The connection component includes two connectors, the two connectors have same butt-joint structures and are in a butt joint through the butt-joint structures, the connectors have locking mechanisms, in a locking state, the locking mechanisms lock the two connectors, and the two connectors may be separated after the locking mechanisms are switched to an unlocking state.

According to a second aspect of the disclosure, a connector is provided. One end of the connector is provided with a butt-joint structure for butt-joint with the other connector. The connector has a locking mechanism, and the locking mechanism includes a locking part for locking two of the connectors after butt-joint and an actuating part for switching a locking state and an unlocking state of the locking part.

According to a third aspect of the disclosure, a patch cord is provided. The patch cord includes a cord body and the connector as described above, the connector is disposed at one end of the cord body. Or, both ends of the cord body are provided with the connector.

According to a fourth aspect of the disclosure, a connector inner shell is provided. The connector inner shell has a slot inside and includes a top wall, the top wall is provided with a locking part, and in a locking state, the locking part extends into the slot to lock a butt-joint structure of the other connector plugged into the slot.

BRIEF DESCRIPTION OF THE DRAWINGS

The accompanying drawings are intended to provide a further understanding of the disclosure, form a part of the description, and are used to explain the disclosure together with the following detailed description, but do not constitute a limitation of the disclosure. In the accompanying drawings.

DESCRIPTION OF REFERENCE NUMERALS

10—first connector; 20—second connector; 30—cord body; 100—main body; 110—plug; 111—locking matching structure; 112—second groove; 120—slot; 130—first terminal; 140—second terminal; 150—housing; 151—outer housing; 152—inner housing; 153—sliding groove; 160—shared side surface; 170—operation space; 180—conductive terminal; 200—locking part; 210—first section; 220—second section; 300—actuating part; 310—actuating portion; 311—guiding slope; 320—shifting block; 400—elastic part; 410—first connection section; 420—second connection section; 500—third elastic sheet; and 510—arc abutting portion.

DETAILED DESCRIPTION

The detailed description of the disclosure is described in detail below in combination with the accompanying drawings. It should be understood that the detailed description described herein is only used to illustrate and explain the disclosure and are not used to limit the disclosure.

In the disclosure, in the absence of any explanation to the contrary, the location words used, such as “inner and outer”, refer to the inside and outside relative to the contour of a part or structure itself. Besides, it should be noted that the terms used such as “first and second” are to distinguish one element from another, and do not have order and importance. In addition, in the description with reference to the drawings, the same symbol in different drawings represents the same element.

According to a first aspect of the disclosure, a connection component is provided, configured to achieve electric connection. Referring to FIG. 1 to FIG. 10, the connection component includes two connectors, for example, a first connector 10 and a second connector 10', and the two connectors have same butt-joint structures and are in a butt joint through the butt-joint structures, so that male and female polarities of the connectors do not need to be distinguished, which brings great convenience in use.

It should be noted here that while the two connectors have the same butt-joint structures, other portions of the two connectors may be constructed as the same structure or different structures, which is not specifically limited herein in the disclosure.

In order to make the two connectors more stable in connection, in some implementations, the connectors have locking mechanisms, in a locking state, the locking mechanisms lock the two connectors, and the two connectors may be separated after the locking mechanisms are switched to an unlocking state. In this way, the two connectors can be selectively locked together to firmly connect the two connectors. For example, after butt-joint of the two connectors, the locking mechanisms may be switched to the locking state to lock the two connectors, or, the locking mechanisms may be kept in the unlocking state to make the two connectors able to be separated or in a butt joint at any time.

Figure 7:
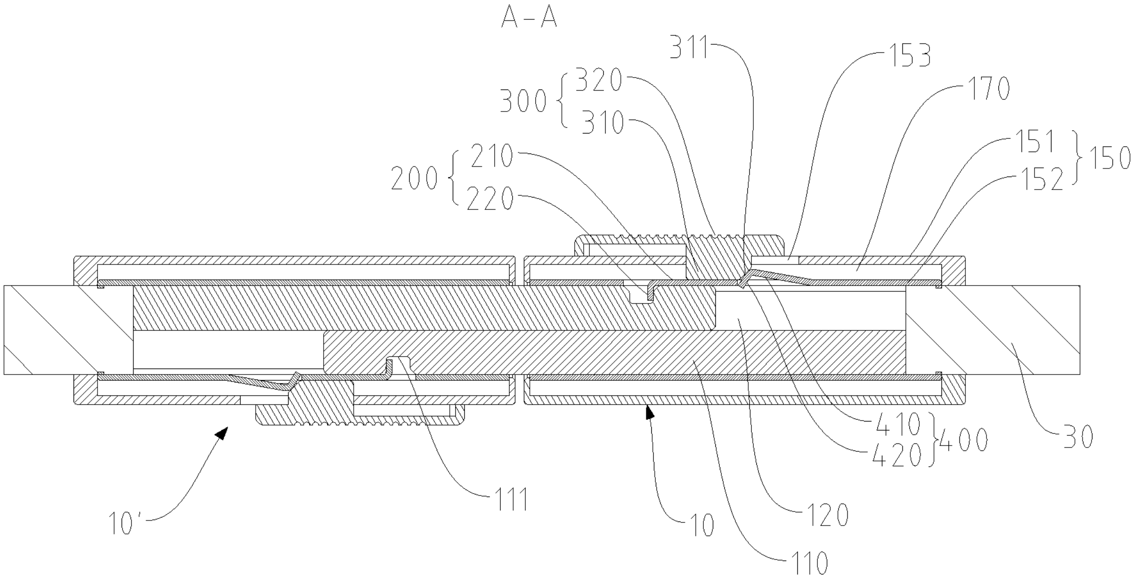
FIG. 7 is a sectional view of a position A-A in FIG. 6.
Figure 9:
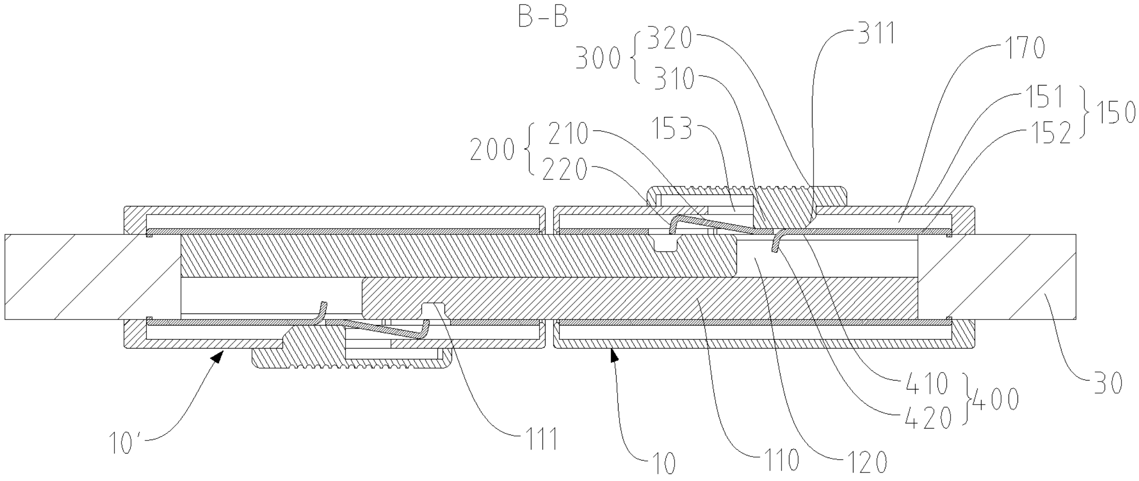
FIG. 9 is a sectional view of a position B-B in FIG. 8.
Figure 10:
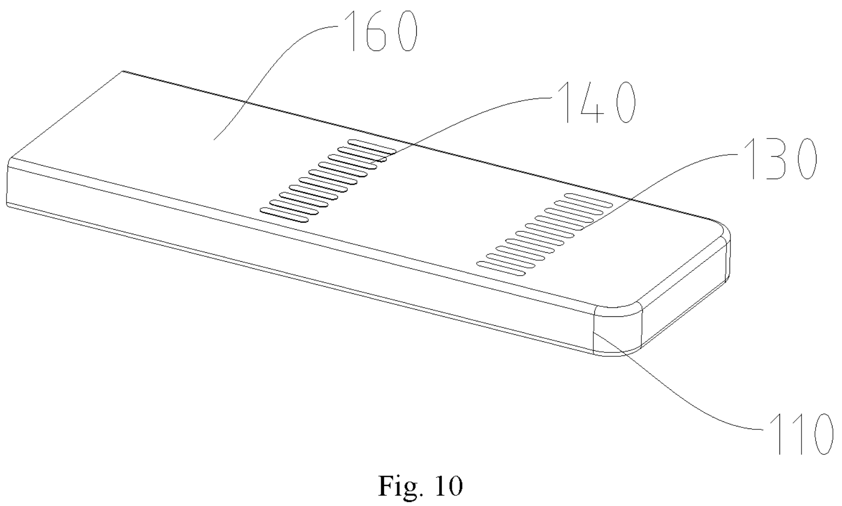
FIG. 10 is another implementation of a plug of a connector provided in an example of the disclosure.

A butt-joint manner of the two connectors may be constructed in any appropriate way according to actual application requirements, for example, in some implementations, the two connectors may be in a butt joint in relatively inverted postures with one forward and one reverse. FIG. 7 and FIG. 9 show schematic diagrams of butt-joint in the relatively inverted postures of the two connectors, and during butt-joint, the second connector 10' may be overturned to be inverted relative to the first connector 10 to achieve butt-joint.

In order to facilitate switching between the unlocking state and the locking state of the locking mechanisms, in some implementations, the connectors further have actuating parts 300 for switching between the locking state and the unlocking state of the locking mechanisms, and force is exerted on the actuating parts 300 to achieve locking and unlocking of the locking mechanisms.

The actuating parts 300 may switch of the state of the locking mechanisms in any appropriate way, for example, in some implementations, the actuating parts 300 are movably disposed on the connectors, and the locking mechanisms are switched to the unlocking state when the actuating parts 300 slide away from the other connector in a butt joint. In this way, sliding of the actuating parts 300 may achieve switching between the locking state and the unlocking state of the locking mechanisms.

Figure 1:
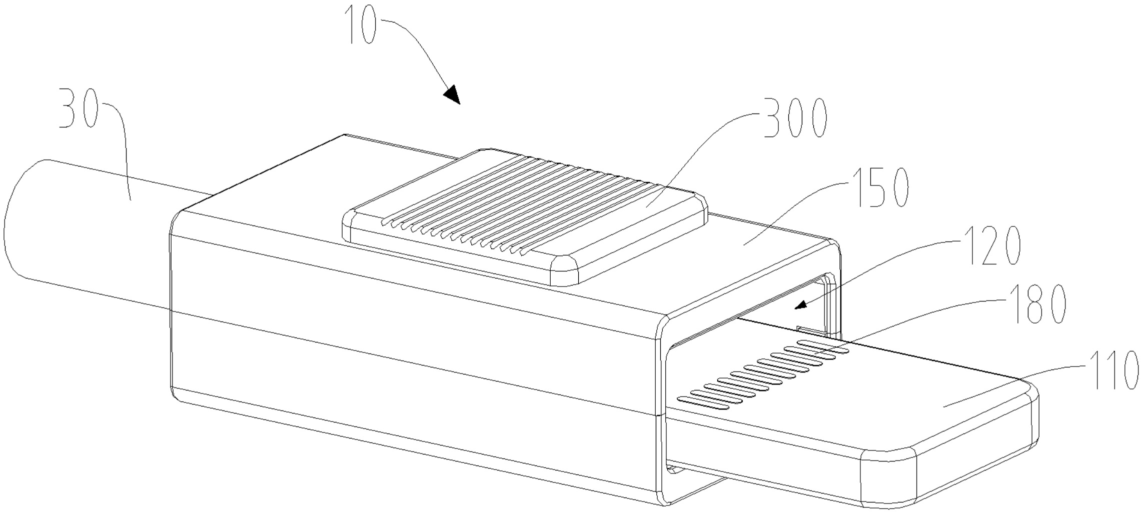
FIG. 1 is a stereoscopic diagram of a connector provided in an example of the disclosure.
Figure 2:
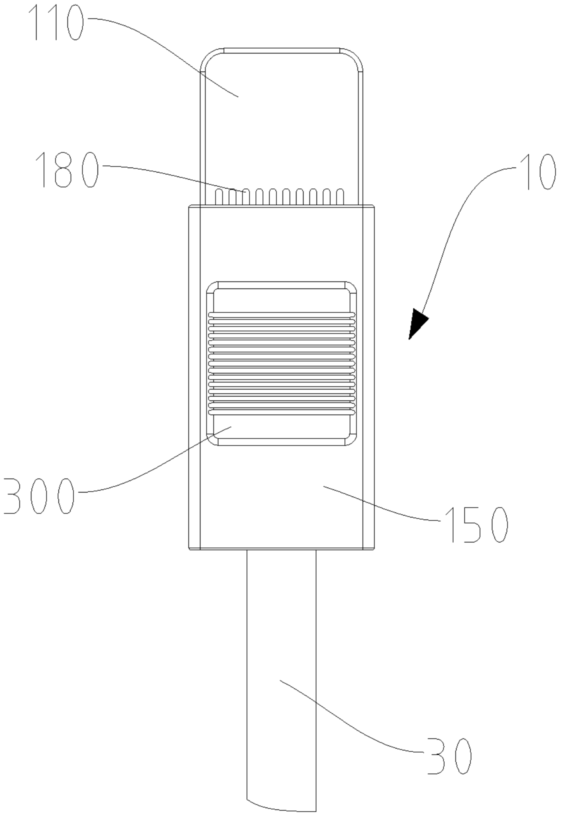
FIG. 2 is a front view of a connector provided in an example of the disclosure.
Figure 3:
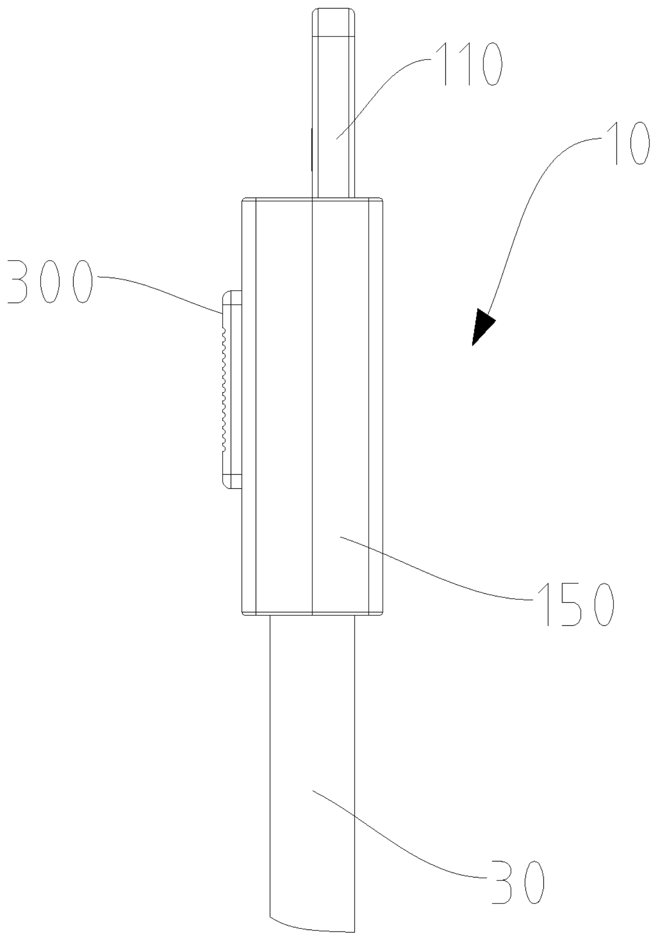
FIG. 3 is a right view of a connector provided in an example of the disclosure.

The butt-joint structures may be constructed in any appropriate way, which aims to achieve butt-joint of the two connectors. For example, in some implementations, the butt-joint structures may include slots 120 and plugs 110, and during butt-joint, the plugs 110 are plugged into the slots of the other corresponding connector, and the slots 120 are plugged by the plugs of the other corresponding connector. FIG. 1, FIG. 7 and FIG. 9 show one of butt-joint manners of the two connectors. When the two connectors are plugged, first, the plug 110 of the first connector 10 is plugged into the slot of the second connector 10', at the same time, the plug of the second connector 10' is also plugged into the slot 120 of the first connector 10, and then the two connectors may be selectively locked together to achieve plugging and locking of the two connectors.

Without departing from the overall inventive concept of the connection component provided in the first aspect of the disclosure, the connectors may be constructed in any appropriate way, for example, a connector provided in a second aspect of the disclosure may be adopted.

In a specific implementation of the second aspect of the disclosure, a connector is provided. Referring to FIG. 1 to FIG. 10, a butt-joint structure for butt-joint with the other connector is disposed at one end of the connector, the connector has a locking mechanism, and the locking mechanism includes a locking part 200 for locking two of the connectors after butt-joint and an actuating part 300 for switching a locking state and an unlocking state of the locking part 200. In this way, the two connectors may be in a butt joint, so that male and female polarities do not need to be distinguished for the connectors any more, which brings great convenience in use. At the same time, through matching of the locking part 200 and the actuating part 300, the two connectors may be selectively locked together.

In some implementations, referring to FIG. 1, the connector may include a housing 150 and a plug 110, the plug 110 extends out of one end of the housing 150, the housing 150 has a slot 120 for being plugged by a plug of the other connector, and the butt-joint structure includes the slot 120 and the plug 110. Through mutual matching of the slots 120 and the plugs 110 of the two connectors, quick plugging of the two connectors can be achieved.

Figure 5:
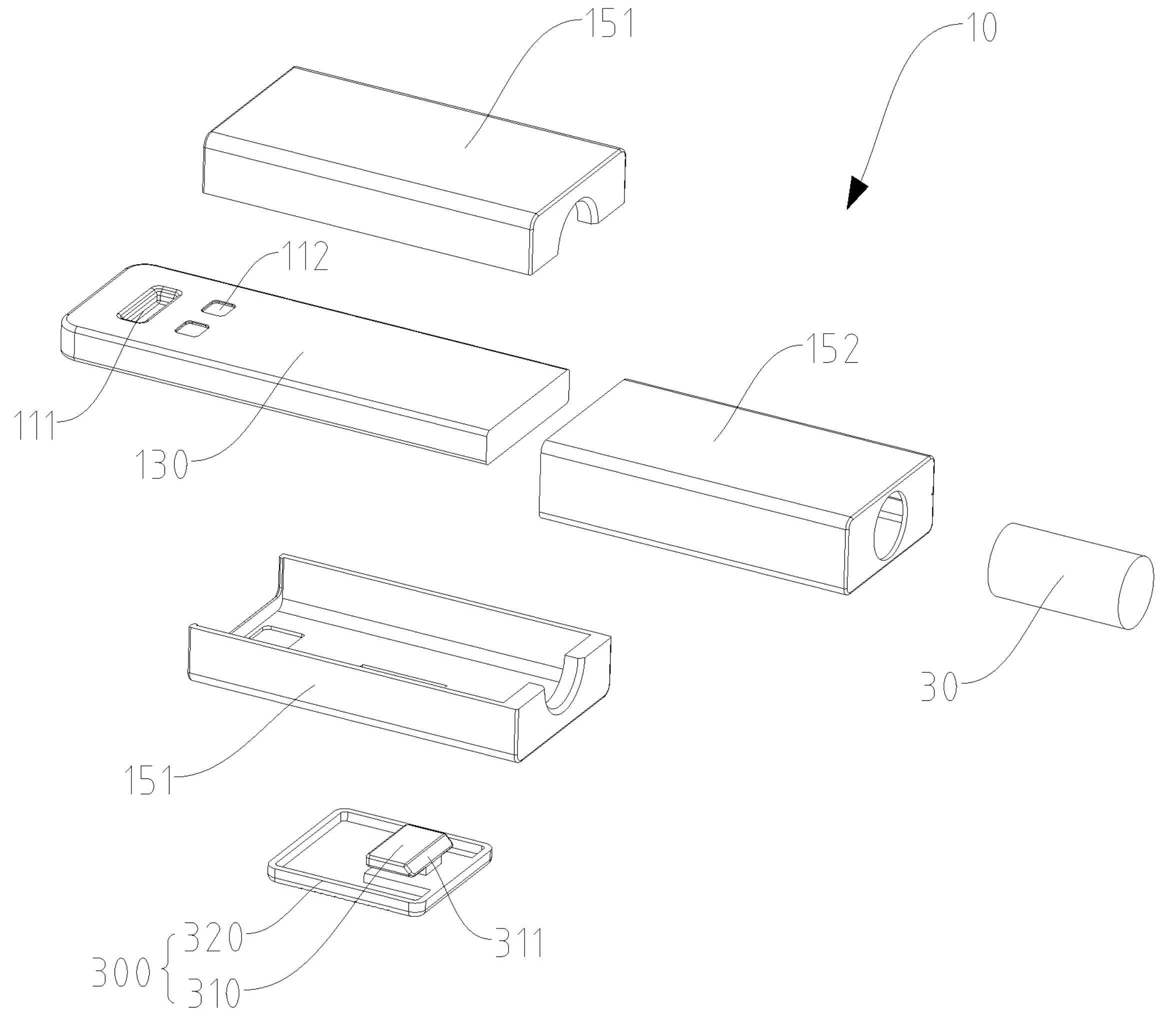
FIG. 5 is an exploded view from another angle of a connector provided in an example of the disclosure.
Figure 6:
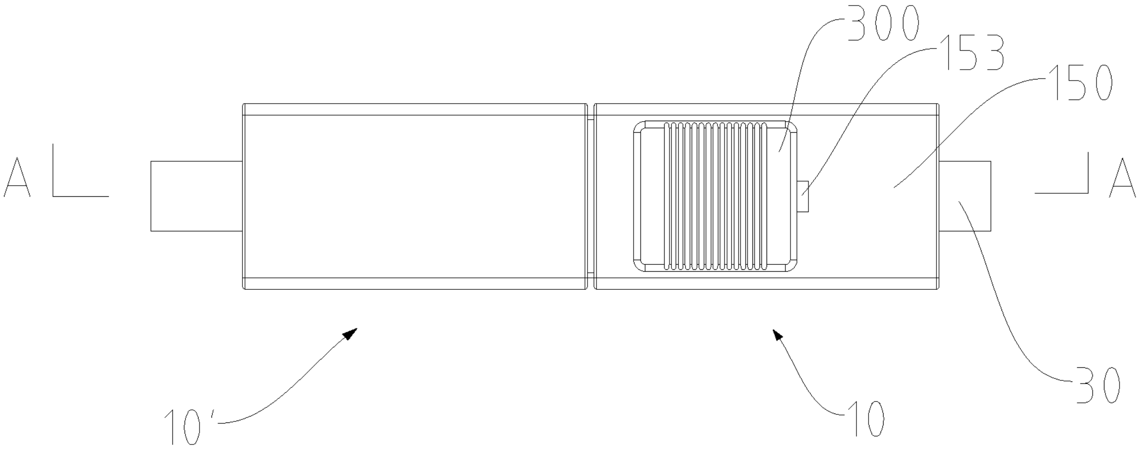
FIG. 6 is a schematic matching diagram of two connectors after plugging and in a locking state provided in an example of the disclosure.

The locking part 200 may lock the two connectors in any appropriate way, for example, in some implementations, referring to FIG. 5 and FIG. 7, a locking matching structure 111 is disposed on a surface of the plug 110 facing away from the slot 120, and the locking part 200 of the connector is matched with the locking matching structure of the other connector plugged into the slot 120 to lock the two connectors. The two connectors are locked through matching of the locking part 200 and the locking matching structure on the plug of the other connector, so that the two connectors can be connected more stably. In some other implementations, the two connectors may also be locked together through a magnetic attraction manner, for example, at least one of the locking part 200 and the locking matching structure 111 has magnetism and achieves locking through mutual magnetic attraction. In addition, in yet some implementations, the locking mechanism may further include a clamping part, the locking mechanism achieves locking through clamping of the clamping part on the locking matching structure 111, and the clamping part may be constructed in any appropriate way, which aims to lock the two connectors through a clamping manner, which is not specifically limited in the disclosure.

After the two connectors are in a butt joint or plugged, electric connection of the two connectors is considered. Thus, in some implementations, referring to FIG. 1, a conductive terminal 180 is disposed on a surface of the plug 110 next to the slot 120, and when the two connectors are plugged, electric connection may be achieved through the conductive terminals 180 on the two connectors. Specifically, the plug 110 and the slot 120 have a shared side surface 160, i.e., a side surface of a side of the plug 110 facing the slot 120, and thus when the two connectors are in plugging fit, the shared side surfaces on the two plugs 110 may be attached or nearly attached, such that the conductive terminal 180 of the first connector 10 and the conductive terminal 180 of the second connector 10' may make contact and be conducted, then male and female polarities do not need to be distinguished for the connectors, and any two connectors can be plugged and communicate.

The conductive terminal 180 may be constructed in any appropriate way according to actual application requirements, for example, in some implementations, referring to FIG. 1, the conductive terminal 180 may be a column of conductive terminals disposed at a position of the plug 110 close to an opening of the slot 120, and when the two connectors are plugged, the plurality of conductive terminals 180 on the two connectors are in contact in one-to-one correspondence and are conducted to achieve electric connection of the two connectors. In some other implementations, referring to FIG. 10, the conductive terminal may further include at least one first terminal 130 and at least one second terminal 140, the at least one first terminal 130 is exposed on an upper surface of the portion of the plug 110 protruding from the housing 150, the at least one second terminal 140 is exposed on an upper surface of the remaining portion the plug 110 located inside the housing 150, an upper surface of the first terminal 130 is flush with the upper surface of the plug 110, an upper surface of the second terminal 140 protrudes from the upper surface of the plug 110, and the second terminal 140 has elasticity, so that when the two connectors are plugged, at least one first terminal of one of the connectors and at least one second terminal of the other connector are in contact in one-to-one correspondence and are conducted, and at least one second terminal of one of the connectors and at least one first terminal of the other connector are in contact in one-to-one correspondence and are conducted to achieve electric connection of the two connectors.

In some other implementations, the locking part 200 and the locking matching structure 111 may be conductive parts and achieve electric conduction when matched for locking. In this way, the locking part 200 and the locking matching structure 111 can achieve both locking and unlocking of the two connectors and electric connection of the two connectors.

Figure 4:
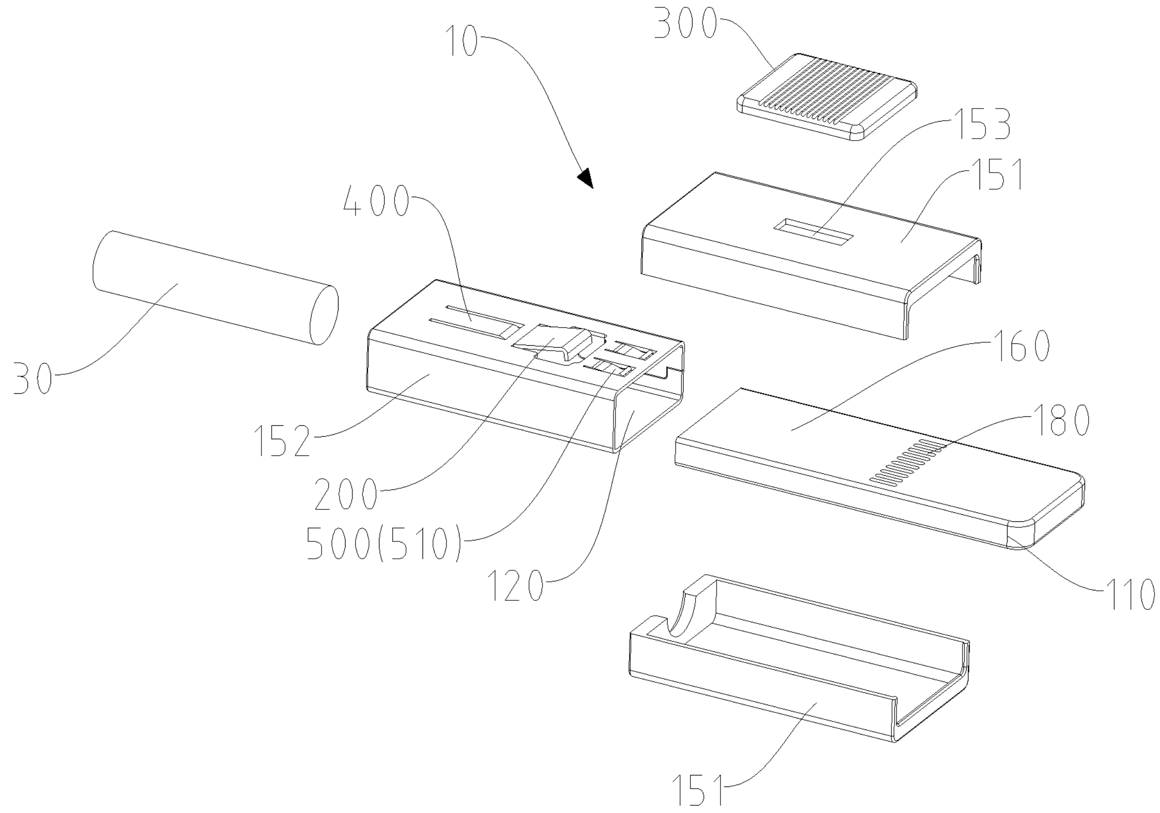
FIG. 4 is an exploded view of a connector provided in an example of the disclosure.

In some implementations, referring to FIG. 4, the housing 150 includes an inner housing 152, the slot 120 is located in the inner housing 152, the locking part 200 is a first elastic sheet formed on the inner housing 152 and is maintained in the unlocking state by utilizing self-elasticity, and the actuating part 300 is movably disposed on the housing 150 and has a first position where the locking part 200 is pressed to extend into the slot 120 to be in the locking state and a second position where the actuating part is separated from the locking part 200. The locking part 200 is configured as the first elastic sheet, such that after the actuating part 300 is moved from the first position to the second position, the first elastic sheet is automatically switched to the unlocking state through self-elasticity, and operation is easy and convenient. In addition, a through hole for being plugged by a cord body 30 is arranged on one side of the housing 150 opposite to an open side of the slot 120, and a cable in the cord body 30 may be connected with the conductive terminal 180.

It should be noted here that the actuating part 300 has the second position where the locking part 200 is separated, "separated" here refers to that the actuating part 300 does not maintain the locking part 200 in the locking state any more, but allows the locking part 200 to recover to the unlocking state, and "separated" herein does not mean that the actuating part 300 and the locking part 200 are completely separated in position and do not make contact.

FIG. 7 shows a schematic matching diagram of the first connector 10 and the second connector 10' after plugging and in the locking state. If the second connector 10' needs to be locked to the first connector 10, then the actuating part 300 may be moved from the second position to the first position shown in FIG. 7, to force the locking part 200 to be switched from the unlocking state to the locking state, and then the locking part 200 is matched with the locking matching structure of the second connector 10' to lock the second connector 10' to the first connector. Similarly, the actuating part of the second connector 10' is moved from the second position to the first position to lock the first connector 10 to the second connector 10' so as to achieve mutual locking of the two connectors, making the two connectors connected more firmly.

FIG. 9 shows a schematic matching diagram of the first connector 10 and the second connector 10' after plugging and in the unlocking state. If the first connector 10 and the second connector 10' do not need to be mutually locked, for example, the first connector 10 and the second connector 10' only need to be temporarily plugged or tentatively plugged, the actuating parts 300 of the first connector 10 and the second connector 10' may be kept at the second position shown in FIG. 9, and at the moment, the two connectors are only connected together through a matching relationship of the plugs 110 and the slots 120 instead of having the locking state, and can be easily separated.

In some implementations, referring to FIG. 7 and FIG. 9, the locking part 200 is of an L-shaped structure and includes a first section 210 tilting by the inner housing 152 and a second section 220 bent relative to the first section 210, in the locking state, the second section 220 extends into the slot 120, and the plug 110 is provided with a first groove for being plugged by the second section 220. In this way, the first groove is the locking matching structure 111. In the process of switching to the locking state, as shown in FIG. 7, the actuating part 300 is moved from the second position to the first position to force the first section 210 to rotate towards the inner housing 152, and then the second section 220 is forced to extend into the slot 120 so as to be capable of being plugged into the first groove of the plug of the other connector during plugging. The locking part 200 may be machined on the inner housing 152 through, for example, stamping, that is, the locking part 200 and the inner housing 152 may be constructed as a whole to reduce assembling processes and improve production efficiency. In some other implementations, the locking part and the locking matching structure may be matched for locking through a manner that the tail end of the locking part is perforated and the locking matching structure is disposed as a protrusion on the plug. In addition, in yet some implementations, the locking matching structure may also be a magnetic part and is connected and fixed with the locking part through magnetic attraction, and it can be guaranteed that the locking part can normally recover to the unlocking state only by making magnetic force smaller than elastic restoring force of the first elastic sheet.

Referring to FIG. 7 and FIG. 9, in some implementations, the housing 150 further includes an outer housing 151 sleeving the inner housing 152, an operation space 170 exists between the outer housing 151 and the inner housing 152, the locking part 200 in the unlocking state is located in the operation space 170, and the actuating part 300 is movably disposed on the outer housing 151 and has an actuating portion 310 extending into the operation space 170 and configured to press the locking part 200. In this way, the operation space 170 is formed between the outer housing 151 and the inner housing 152, and the actuating portion 310 and the locking part 200 are disposed in the operation space 170, so that good concealment is achieved. Only a shifting block 320 (described below) is exposed out of the outer housing 151 to facilitate recognition and operation of personnel. The inner housing 152 may adopt a sheet metal support, configured to clamp the cord body 30 and fix main elements, such as the plug 110. The outer housing may be made of a dielectric material, such as a thermoplastic polymer, which is not specifically limited herein in the disclosure.

In order to further make personnel operate unlocking and locking processes of the locking mechanism conveniently, in some implementations, referring to FIG. 7 and FIG. 9, the outer housing 151 is provided with a sliding groove 153 extending in a plugging direction of the connector, the actuating part 300 is slidably connected to the sliding groove 153 and has the shifting block 320 extending out of the outer housing 151, the first position of the actuating part 300 is one end in the sliding groove 153 relatively close to the opening of the slot 120, the second position of the actuating part 300 is one end in the sliding groove 153 relatively away from the opening of the slot 120, and a sliding direction of the actuating part 300 moving from the second position to the first position is the same as the plugging direction of the connector. In this way, referring to FIG. 7 and FIG. 9, for example, when the first connector 10 is plugged to the second connector 10', the actuating part 300 may be moved from the second position to the first position in the plugging direction at its convenience, so that the second connector 10' is quickly locked to the first connector 10. Similarly, when the first connector 10 and the second connector 10' are separated, the actuating part 300 may be moved from the first position to the second position in a separation direction opposite to the plugging direction at its convenience, so that the unlocking process is quickly completed, and the first connector 10 and the second connector 10' are separated. The shifting block 320 may be provided with anti-skid lines to prevent slipping during pushing. The anti-skid lines may be disposed in any appropriate way, for example, a plurality of anti-skid grooves disposed side by side and at intervals may be adopted, which is not specifically limited by the disclosure.

In order to make the locking mechanism in the locking state more stably, in some implementations, referring to FIG. 7 and FIG. 9, the locking mechanism further includes an elastic part 400 formed on the inner housing 152, and the elastic part 400 abuts against the actuating part 300 under the action of self-elasticity to provide elasticity keeping the actuating part 300 at the first position. In this way, in the locking state, the elastic part 400 may be used to provide elasticity to keep the actuating part 300 at the first position so as to make the locking state more stable.

Figure 8:
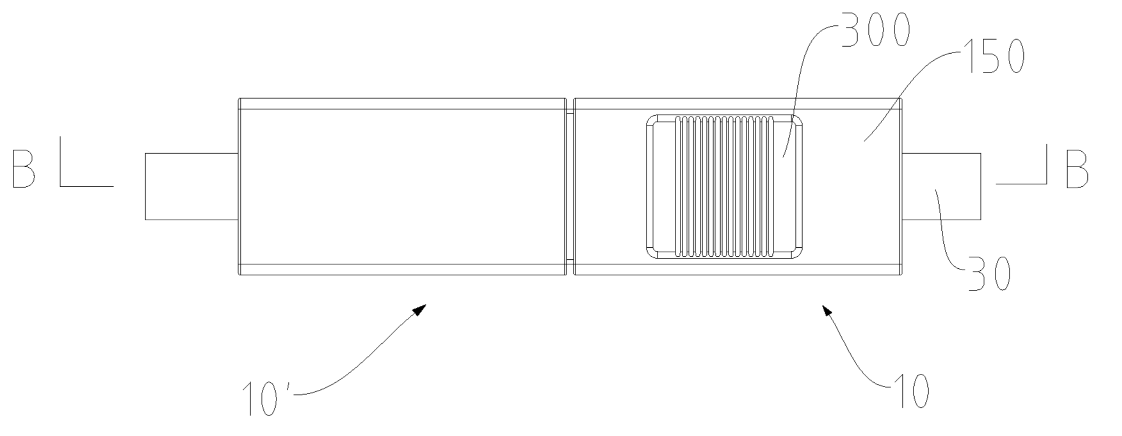
FIG. 8 is a schematic matching diagram of two connectors after plugging and in an unlocking state provided in an example of the disclosure.

The elastic part 400 may be constructed in any appropriate way, for example, the elastic part 400 may be constructed as a spring, so that when the actuating part 300 is at the first position, the actuating part 300 is limited at the first position by the elasticity of the spring, and when the actuating part 300 is moved from the first position to the second position, the shifting block 320 is pushed through external force to overcome the elasticity of the spring. In some other implementations, referring to FIG. 7 and FIG. 9, the elastic part 400 may also be constructed as a second elastic sheet, the second elastic sheet is of an L-shaped structure and includes a first connection section 410 tilting by the inner housing 152 and a second connection section 420 bent relative to the first connection section 410, the first connection section 410 is fixedly connected to the inner housing 152, and at the second position, the actuating part 300 forces the second connection section 420 to move into the slot 120, and the actuating part 300 can be kept at the second position. In this way, when the actuating part 300 is moved from the first position to the second position, first, the second connection section 420 is forced to move towards the inside of the slot 120, while moving, the first connection section 410 is driven to rotate towards the slot 120, when the actuating part is moved to the second position, the actuating part 300 can press over the first connection section 410 as shown in FIG. 8, and through counterforce of the first connection section 410, the actuating part 300 can be kept at the second position. In this way, the actuating part 300 can be kept at the first position or the second position, and will not sway at will without external force, and personnel can conveniently operate and recognize the current position of the actuating part 300, that is, the personnel can conveniently recognize the current state of the connector. The second elastic sheet may be machined on the inner housing 152 through, for example, stamping, that is, the second elastic sheet and the inner housing 152 may be constructed as a whole to reduce assembling processes and improve production efficiency.

In some implementations, referring to FIG. 5, FIG. 7 and FIG. 9, the actuating part 300 has a guiding slope 311 which makes contact with the elastic part 400 and presses the elastic part 400 when the actuating part 300 slides to the second position, such that the actuating part 300 is moved from the first position to the second position by overcoming the elasticity of the elastic part 400, and jamming of the actuating part 300 in the moving process can be avoided. Referring to FIG. 7, the guiding slope 311 extends towards one side away from the inner housing 152 and towards one side where the elastic part 400 is located, and accordingly, when the actuating part 300 is located at the first position, the second connection section 420 of the elastic part 400 has a gradient similar to or same as that of the guiding slope 311 to avoid jamming.

In some implementations, referring to FIG. 4 and FIG. 5, the inner housing 152 is provided with a third elastic sheet 500, the third elastic sheet 500 has an arc abutting portion 510 extending into the slot 120, the plug 110 is provided with a second groove 112, the arc abutting portion 510 is configured to abut against the second groove in a plug of the other connector so as to provide damping when two of the connectors are mutually plugged or separated, and when two of the connectors are in a butt joint, the arc abutting portion 510 is configured to provide pre-tightening force between two plugs of two of the connectors. In this way, for example, when the first connector 10 and the second connector 10' are plugged or separated, the third elastic sheet 500 can provide damping, so that the two connectors are not prone to sliding relatively when plugged and in the unlocking state. During plugging, the arc abutting portion 510 of the first connector 10 abuts against the second groove of the other connector 10', such that the purpose of pre-positioning for the plugging process can be achieved, that is, the conductive terminal 180 of the first connector 10 can be aligned with the conductive terminal 180 of the second connector 10', and the locking part of one of the connectors can be precisely aligned with the locking matching structure of the other connector to be switched to the locking state at any time conveniently. In addition, when the two connectors are plugged, the arc abutting portion 510 can provide the pre-tightening force between the two plugs, such that the conductive terminals 180 on the two plugs are in close contact to enhance the stability of electric connection of the two connectors.

The connector provided in the second aspect of the disclosure may be applied to various types of electronic devices, such as a terminal device, an adapting device and a storage device. FIG. 1 to FIG. 9 show implementations where the connector is connected to a cord body 30 of a patch cord.

According to a third aspect of the disclosure, a patch cord is provided. The patch cord includes a cord body 30 and the connector as described above, the connector may be disposed only at one end of the cord body 30; or, both ends of the cord body 30 are provided with the connector. Two patch cords with connectors may be directly connected in series. The patch cord can solve the problems of distinguishing between male and female polarities for the connector and easy slipping off in the related art, and has all the beneficial effects of the above connector, which are omitted herein in the disclosure.

Returning to the connector provided in the second aspect of the disclosure, in the implementation, the two connectors with the same butt-joint structures can be in a butt joint and can be mutually locked through the locking parts 200 of the locking mechanisms to solve the problems of inconvenient use caused by distinguishing between male and female polarities and easy slipping off caused by lacking of a locking structure of a connector in the related art. Without departing from the overall inventive concept of the disclosure, the inner housing 152 of the connector may be constructed in any appropriate way, for example, a connector inner shell provided in a fourth aspect of the disclosure may be adopted.

In an implementation of the fourth aspect of the disclosure, a connector inner shell is provided, having a slot 120 inside. The connector inner shell includes a top wall, the top wall is provided with a locking part 200, and in a locking state, the locking part 200 extends into the slot 120 to lock a butt-joint structure of the other connector plugged into the slot 120, so that the two connectors can be connected more stably.

In some implementations, the locking part 200 is formed by a first elastic sheet tilting relative to the top wall and is maintained in an unlocking state in which the locking part does not extend into the slot 120 by utilizing self-elasticity. The locking part 200 adopts the form of the elastic sheet and is matched with an actuating part 300 of the connector, so that switching of the locking state and the unlocking state is quick and convenient.

In some implementations, the connector inner shell is further provided with a second elastic sheet tilting relative to the top wall, the locking part 200 is closer to an open end of the slot 120 relative to the second elastic sheet, and thus through mutual matching of the second elastic sheet and the actuating part 300, the actuating part 300 can be kept at a first position or a second position and cannot sway at will, so that personnel can conveniently operate and recognize the current position of the actuating part 300, that is, the personnel can conveniently recognize the current state of the connector.

In some implementations, the connector inner shell is further provided with a third elastic sheet 500, the third elastic sheet 500 has an arc abutting portion 510 extending into the slot 120, and the third elastic sheet 500 is closer to the open end of the slot 120 relative to the locking part 200. Through mutual matching of the third elastic sheet 500 and a second groove in the other connector, the purpose of pre-positioning for a plugging process can be achieved, and pre-tightening force between two plugs can be provided, such that conductive terminals 180 on the two plugs are in close contact to enhance the stability of electric connection of the two connectors.

The preferred implementations of the disclosure are described in detail above in combination with the accompanying drawings. However, the disclosure is not limited to the specific details of the above implementations. Within the scope of the technical concept of the disclosure, a variety of simple modifications can be made to the technical solutions of the disclosure, and these simple modifications belong to the protection scope of the disclosure.

In addition, it should be noted that the specific technical features described in the above specific implementations can be combined in any suitable way without contradiction. In order to avoid unnecessary repetition, various possible combination methods will not be described separately in the disclosure.

In addition, various different implementations of the disclosure can also be combined arbitrarily. As long as they do not violate the idea of the disclosure, they should also be regarded as the contents disclosed in the disclosure.

What is claimed is:

1. A connector, wherein one end of the connector is provided with a butt-joint structure for a butt joint with another connector, the connector has a locking mechanism, and the locking mechanism comprises a locking part for locking the connector and the another connector after the butt joint and an actuating part configured to switch between a locking state and an unlocking state of the locking part;

wherein the connector comprises a housing and a plug, the plug extends out of one end of the housing, the housing has a slot for being plugged by a plug of the another connector, and the butt-joint structure comprises the slot and the plug; and a locking matching structure is disposed on a surface of the plug facing away from the slot, and the locking part of the connector is matched with a locking matching structure of the another connector plugged into the slot to lock two of the connectors;

wherein the housing comprises an inner housing, the slot is located in the inner housing, the locking part is a first elastic sheet formed on the inner housing and is maintained in the unlocking state by utilizing self-elasticity, and the actuating part is movably disposed on the housing and has a first position where the locking part is pressed to extend into the slot to be in the locking state and a second position where the actuating part is separated from the locking part; and wherein the housing further comprises an outer housing sleeving the inner housing, an operation space exists between the outer housing and the inner housing, the locking part in the unlocking state is located in the operation space, and the actuating part is movably disposed on the outer housing and has an actuating portion extending into the operation space and configured to press the locking part.

2. The connector according to claim 1, wherein at least one of the locking part and the locking matching structure has magnetism and achieves locking through mutual magnetic attraction.

3. The connector according to claim 1, wherein the locking mechanism comprises a clamping part, and the locking mechanism is configured to achieve locking through clamping of the clamping part on the locking matching structure.

4. The connector according to claim 1, wherein a conductive terminal is disposed on a surface of the plug next to the slot; or, the locking part and the locking matching structure are conductive parts and configured to achieve electric conduction when matched for locking.

5. The connector according to claim 1, wherein the locking part is of an L-shaped structure and comprises a first section tilting by the inner housing and a second section bent relative to the first section, in the locking state, the second section extends into the slot, and the plug is provided with a first groove for being plugged by the second section.

6. The connector according to claim 1, wherein the outer housing is provided with a sliding groove extending in a plugging direction of the connector, the actuating part is slidably connected to the sliding groove and has a shifting block extending out of the outer housing, and a direction of the actuating part moving from the second position to the first position is the same as the plugging direction of the connector.

7. The connector according to claim 1, wherein the locking mechanism further comprises an elastic part formed on the inner housing, and the elastic part abuts against the actuating part under an action of self-elasticity to provide elasticity keeping the actuating part at the first position; and the elastic part is constructed as a second elastic sheet, the second elastic sheet is of an L-shaped structure and comprises a first connection section tilting by the inner housing and a second connection section bent relative to the first connection section, the first connection section is fixedly connected to the inner housing, and at the second position, the actuating part forces the second connection section to move into the slot.

8. The connector according to claim 7, wherein the actuating part comprises a guiding slope making contact with the elastic part and pressing the elastic part when the actuating part slides to the second position.

9. The connector according to claim 1, wherein the inner housing is provided with an elastic sheet, the elastic sheet has an arc abutting portion extending into the slot, the plug is provided with a groove, the arc abutting portion is configured to abut against a groove in a plug of the another connector so as to provide damping when two of the connectors are mutually plugged or separated, and when two of the connectors are in the butt joint, the arc abutting portion is configured to provide pre-tightening force between two plugs of two of the connectors.

10. A patch cord, comprising a cord body and the connector according to claim 1, wherein the connector is disposed at one end of the cord body; or, both ends of the cord body are provided with the connector.

* * * * *